Jan. 15, 1935. A. T. LARSON 1,987,856

ELECTRIC LIGHT CORD REEL

Filed March 22, 1932 2 Sheets-Sheet 1

Inventor

Albert T. Larson

By Clarence A. O'Brien
Attorney

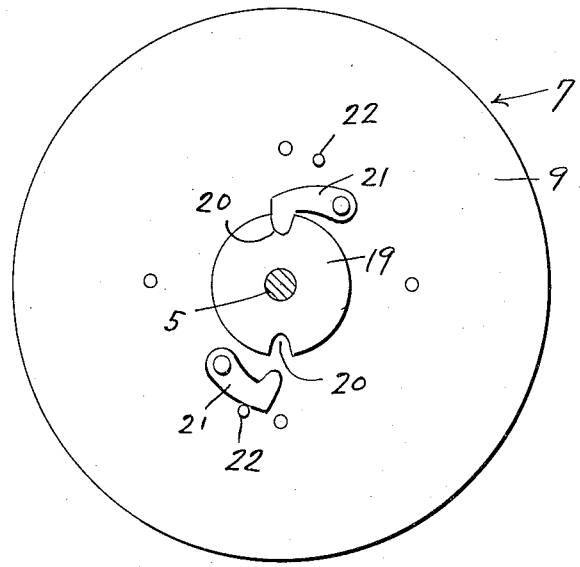
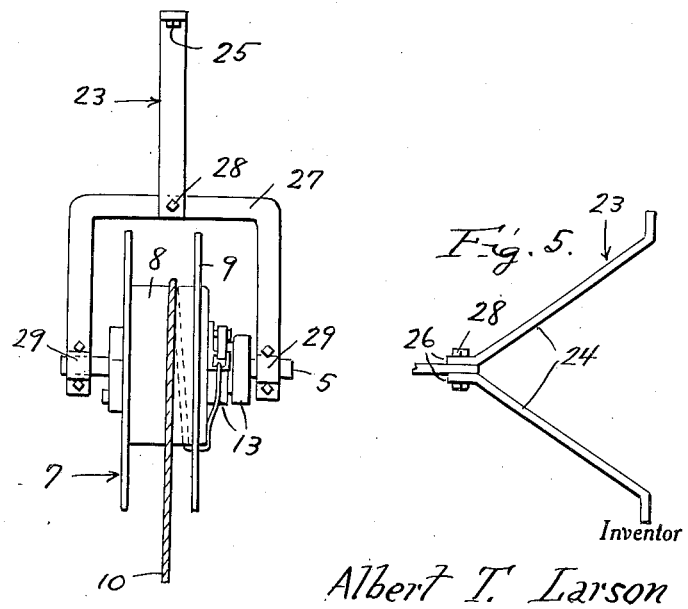

Patented Jan. 15, 1935

1,987,856

UNITED STATES PATENT OFFICE 1,987,856

ELECTRIC LIGHT CORD REEL

Albert T. Larson, Oakland, Calif.

Application March 22, 1932, Serial No. 600,537

2 Claims. (Cl. 173—367)

The present invention relates to an electric light cord reel and has for its primary object to provide, in a manner as hereinafter set forth, a device of this character which will permit the cord to be unwound to the extent desired and will automatically rewind said cord, the invention further including novel means for maintaining a constant electrical connection between the light and the source of electric current supply.

Another important object of the invention is to provide an electric light cord reel including novel means for mounting said reel on a support, such as a wall.

Other objects of the invention are to provide an electric light cord reel of the aforementioned character which will be simple in construction, strong, durable, efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 3 is a view in vertical section, taken substantially on the line 3—3 of Figure 2.

Figure 4 is a top plan view of the reel, showing a slightly modified form of supporting means.

Figure 5 is a view in side elevation showing a portion of the modified supporting means illustrated in Figure 4.

Figure 1:
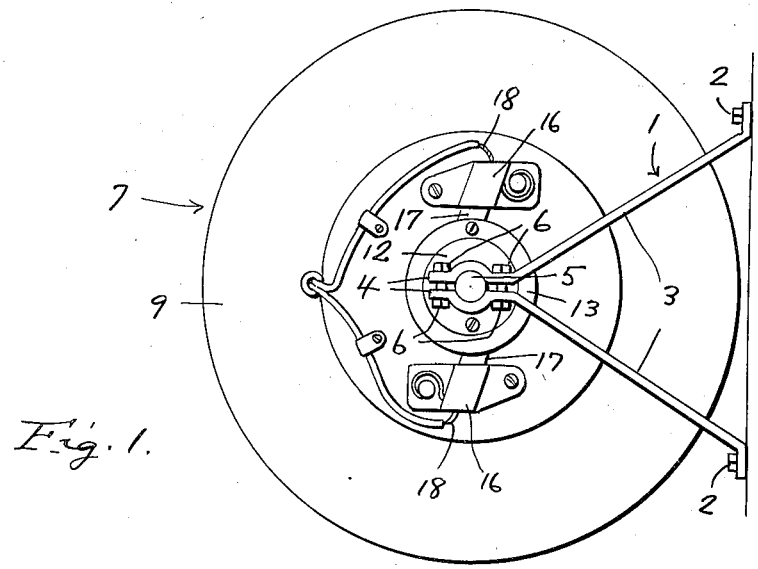
Figure 1 is a view in side elevation of a reel constructed in accordance with the present invention.

Referring now to the drawings in detail, it will be seen that the reference numeral 1 designates generally a pair of brackets which are secured on a wall, as at 2. The brackets 1 comprise the outwardly converging upper and lower duplicate members 3 having their outer end portions formed to provide the opposed jaws 4 between which a stationary shaft 5 is clamped by nut equipped bolts 6.

A drum which is designated generally by the reference numeral 7 is mounted for rotation on the shaft 5 between the brackets 1, said drum including an internally flanged cylindrical portion 8 to which the sides 9 are secured. The electric cord is designated by the reference numeral 10 and is, of course, windable on the drum 7. A spring 11 is mounted in the drum 7 and has one end connected to said drum and its other end secured to the shaft 5. The spring 11 is wound when the cord 10 is unwound from the drum 7 and function to actuate said drum to rewind the cord 10 thereon when said cord is released.

Figure 2:
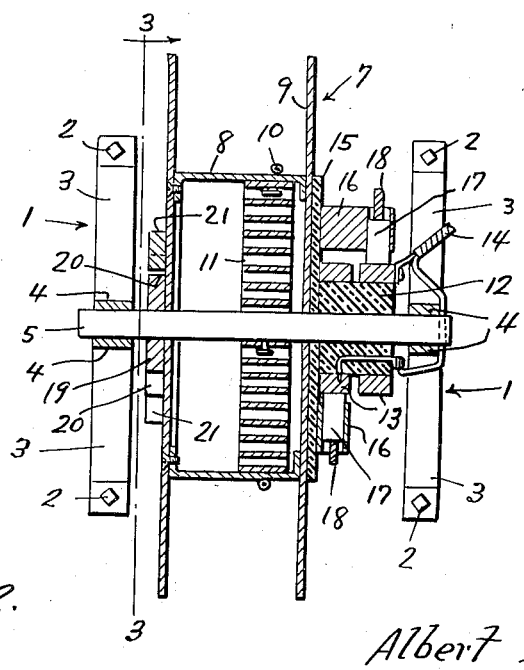
Figure 2 is a view in vertical section through the reel.

Fixed on the shaft 5 adjacent one side of the drum 7 is a block 12 of insulating material having fixed thereon the spaced contact rings 13. The electric cord 14 from a source of supply has a wire connected to each of the contact rings 13, as illustrated to advantage in Figure 2 of the drawings.

An insulating disk 15 is mounted on one side of the drum 7 between said drum 7 and the block 12 and said disk, in turn, has mounted thereon the holders 16 in which the brushes 17 are mounted and constantly engaged with the rings 13, one brush, of course, being engaged with each ring. Wires 18 connect the brushes 17 with the wires of the light cord 10.

Fixed on the shaft 5 adjacent the other side of the drum 7 is a disk 19 having notches 20 in diametrically opposite sides thereof for the reception of the dogs 21 which are pivotally mounted on the drum 7. Stop pins 22 project from the drum 7 for engagement with the dogs 21 for limiting the swinging movement of said dogs away from the disk 19. The dogs 21 provide means for releasably retaining the drum 7 against actuation by the spring 11.

In the slightly modified form of the supporting structure illustrated in Figures 4 and 5 of the drawings, said supporting structure includes a single bracket designated generally by the reference numeral 23 and comprising the duplicate upper and lower members 24 which are secured, as at 25, to a wall, and which converge outwardly and terminate, at their outer ends, in parallel, opposed portions 26 between which a yoke 27 is pivotally mounted for swinging movement in a horizontal plane by a bolt 28. Suitable clamps 29 are provided on the end portions of the yoke 27 for securing the shaft 5 in position.

It is believed that the many advantages of an electric light cord reel constructed in accordance with the present invention will be readily understood, and although the preferred embodiments of the invention are as illustrated and described, it is to be understood that further changes in the details of construction and in the combination and arrangement of parts may be resorted to which will fall within the scope of the invention as claimed.

What is claimed is:—

1. An electric-light-cord reel comprising a fixedly supported shaft, a drum rotatively mounted on said shaft, a spring within the drum having one end connected to the shaft and the other end to the drum in such manner that the spring is tensioned by rotation of the drum in one direction, an insulating block of dielectric material affixed to the shaft adjacent to said drum, contact rings carried by said block, means connecting said rings with a source of electrical energy, an insulating disk secured to and movable with said drum, said disk being interposed between the drum and the insulating block, contact brushes carried by said disk in approximately radial positions and having their inner ends engaging the respective contact rings, said brushes being constructed and arranged for direct connection with the ends of a cord wound upon said drum, and means for releasably holding the drum against rotation under tension of said spring.

2. An electric-light-cord reel comprising a fixedly supported shaft, a drum rotatively mounted on said shaft, a spring within the drum having one end connected to the shaft and the other end connected to the drum in such manner that the spring is tensioned by rotation of the drum in one direction, an insulating block of dielectric material affixed to and concentric with said shaft and adjacent one end of said drum, concentric contact rings carried by said block, means connecting said rings with a source of electrical energy, an insulating disk interposed between the drum and the block and secured to the drum, holders carried by the insulating disks and extending axially therefrom in a position to overhang the respective contact rings, brushes carried by said holders, said brushes each having one end contacting with a ring and the other end constructed and arranged for direct connection with the end of a cord mounted on said drum, and means for releasably holding said drum against rotation under the tension of said spring.

ALBERT T. LARSON.